Jan. 14, 1936.      H. F. SCHIPPEL      2,028,015
RESILIENT WHEEL AND METHOD OF MAKING THE SAME
Filed Nov. 25, 1933      2 Sheets-Sheet 1
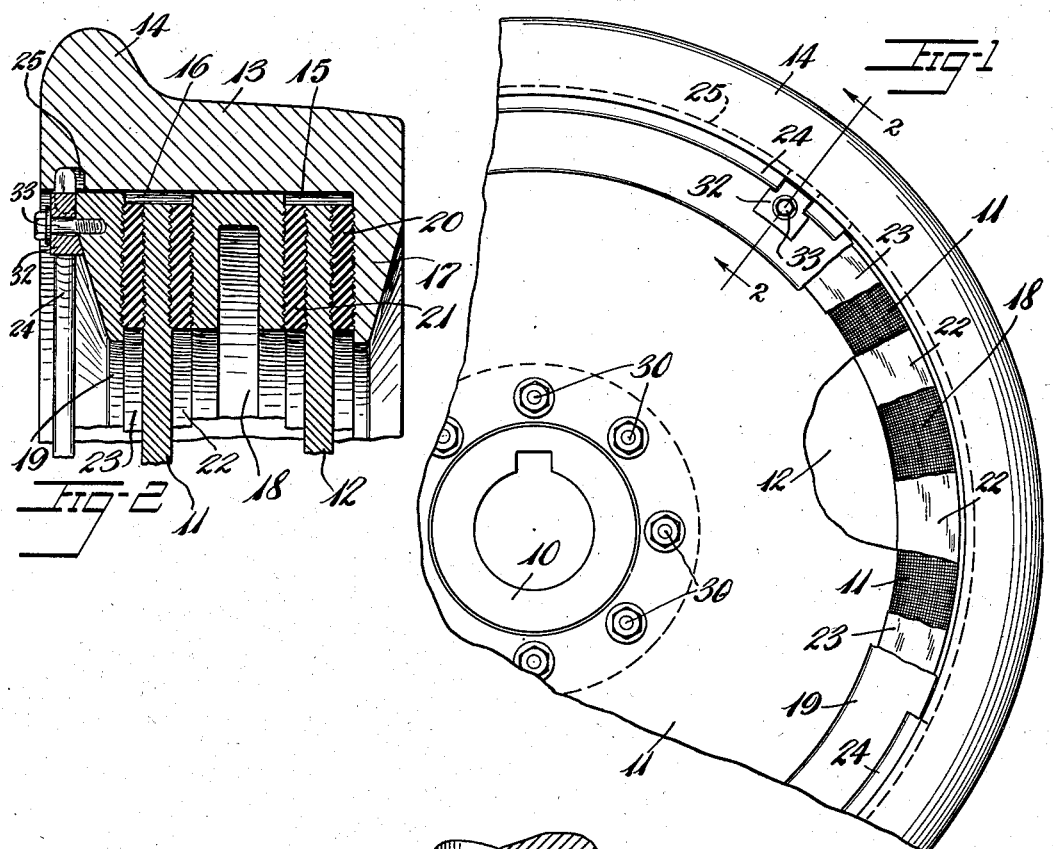
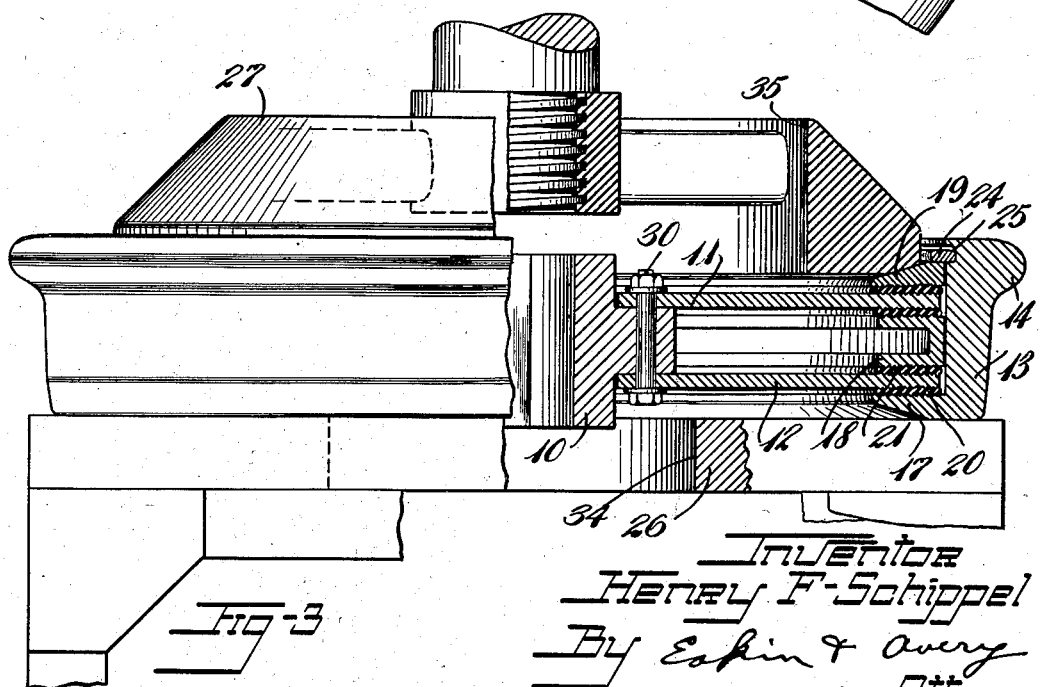
INVENTOR
Henry F. Schippel
By Eskin & Avery
Attys.

Jan. 14, 1936.          H. F. SCHIPPEL                2,028,015
          RESILIENT WHEEL AND METHOD OF MAKING THE SAME
                  Filed Nov. 25, 1933          2 Sheets-Sheet 2
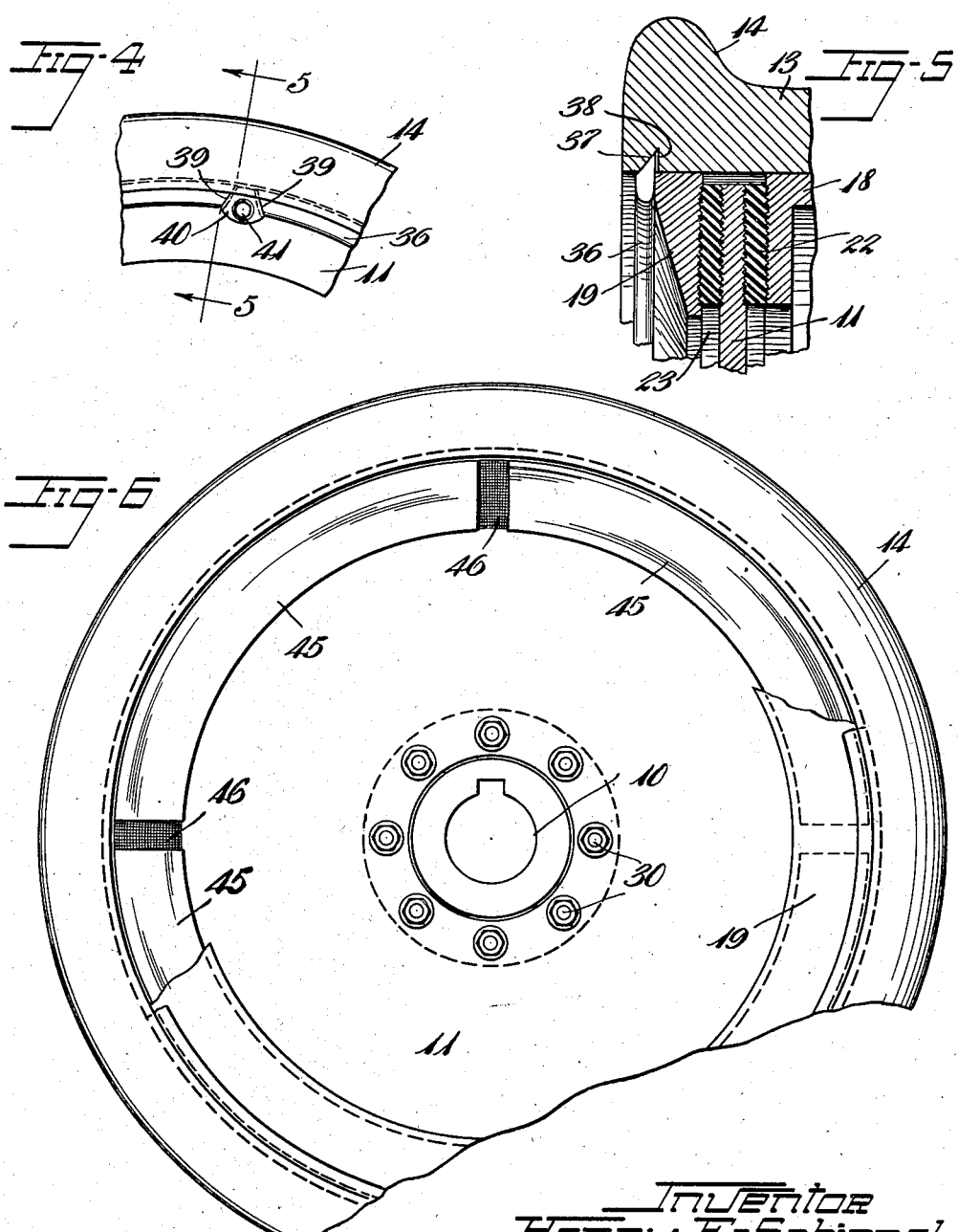

Patented Jan. 14, 1936

2,028,015

UNITED STATES PATENT OFFICE 2,028,015

RESILIENT WHEEL AND METHOD OF MAKING THE SAME

Henry F. Schippel, Akron, Ohio, assignor to The B. F. Goodrich Company, New York, N. Y., a corporation of New York Application November 25, 1933, Serial No. 699,725

2 Claims. (Cl. 295—11)

This invention relates to resilient wheels, especially resilient wheels suitable for railroad use, and to procedure for making the same. This invention is an improvement over the invention described and claimed in the copending application of C. W. Bedford and myself, Serial No. 693,940, filed October 17, 1933.

The wheel of said copending application includes the feature of one or more rubber cushions held compressed in the axial direction between radially extending, roughened faces of the wheel body and the rim structure, the rubber being preferably unadhered to the metal faces and being unrestrained at its peripheral edge faces so that it is distended in the radial direction in compensation for the axial compression and possesses a large amount of available recoil for the continued exertion of strong pressure against the contacted faces for resisting slippage under the load forces, the load being sustained by shear stress on the cushion. In that construction the metal parts and the rubber cushions are held in the proper association by clamping elements such as bolts which pass through the rim structure and hold portions of adjacent rubber-contacting elements of the rim structure in fixed positions, the metal parts and the rubber cushions being of such dimensional accuracy as to provide the desired degree of compressive force on each cushion in the axial direction and the desired uniformity of compressive force on the several rubber cushions.

It is an object of the present invention to provide a construction in which the parts are held clamped in such association that there will be an automatic equalization of the compressive force on the cushions, so that individual cushions will take more nearly their full share of the load even where there are slight dimensional inaccuracies of the parts, or variations in the yielding qualities of the cushions.

Other objects are to provide an improved manner of detachably clamping the parts in their assembled relation, to provide simplicity and ruggedness of construction, and to provide for convenience in assembling the structure.

These and further objects will be apparent from the following description, reference being had to the accompanying drawings, in which:

Fig. 1 is a side elevation, with parts broken away, of a wheel constructed according to and embodying the invention in its preferred form.

Fig. 2 is a section along the line 2—2 of Fig. 1.

Fig. 3 is an elevation, with parts broken away and sectioned, of assembling apparatus, a wheel being shown in association therewith at a stage in the assembling procedure.

Fig. 4 is a view like Fig. 1 but showing a modified construction.

Fig. 5 is a section along the line 5—5 of Fig. 4.

Fig. 6 is a view like Fig. 1 but showing a further modified construction.

Referring to the drawings, the wheel comprises a body including a hub 10 having a pair of axially spaced discs 11, 12 extending radially therefrom, and secured to the hub by any suitable means such as bolts 30, 30. Each disc at its outer periphery presents a pair of annular faces lying vertical in the upright wheel. A rim 13, flanged at 14 for rail use, circumscribes the peripheries of the discs 11, 12 in axially spaced relation thereto, as indicated at 15, 16, to permit relative vertical movement of the rim and wheel body. At the edge opposite to the rail flange 14, the rim is formed with a flange 17 that extends radially inward and overlaps the outer of the two annular faces of disc 12.

Between the discs 11 and 12 is interposed an annular member 18 having vertical faces overlapping the inner of the annular faces of the discs. The member 18 has a sliding fit at its outer periphery with the inner annular wall of the rim which is substantially parallel with the wheel axis. A ring member 19, also having a sliding fit with the inner wall of the rim 13, has a vertical annular face overlapping the outer annular face of the disc 11.

Four rubber cushioning rings 20, 21, 22 and 23 are interposed between the pairs of opposed annular faces of the rim flange 17, disc 12, member 18, disc 11, and ring member 19, and by means of a split retaining ring 24 cooperating with the ring member 19 and seating in an annular groove 25 in the rim, the rubber rings are held compressed in the axial direction between the vertical faces of the several intercalated wheel parts, the rubber rings in their unstrained condition being sufficiently larger in axial thickness than the corresponding dimension of the spaces they occupy to provide the desired degree of compression. For detachably locking the ring 24 in place a block 32 may be provided, fitting between the ends of the split ring and secured to the annular member 19 as by a stud bolt 33.

The rings 20, 21, 22 and 23 are of a rubber compound having the characteristics of low permanent set, i. e., permanently high resilience, to give a large amount of available recoil when distorted, and in their axially compressed condition in the assembled wheel, they are effective to resist slippage of the cushions relative to the contacted faces of the wheel parts in the vertical direction under the load forces, and by the distortion resulting from the axial compression they are apparently appreciably stiffened, as compared with the unstressed condition, against relative movement of the wheel body and rim, so that deflection will not be excessively large even under heavy loads.

It is preferred not to adhere or bond the rubber to the metal, so that during the procedure of assembling the parts and compressing the rubber rings in the axial direction, the rubber will be free to creep along the metal surfaces as it is distended radially in compensation for the axial compression, and in the assembled structure the free inner and outer peripheries of the rubber rings will not have excessive tensile stresses imposed upon them, such as might result if the rubber were restrained by adhesion to the metal surfaces. The vertical faces of the rubber rings preferably are plain surfaced, and the rubber-contacting surfaces of the metal are preferably formed with irregularities, such as pyramidal knurling, which permits the creepage of the rubber to occur during the assembling operation, but which in the assembled structure, when the rubber is held pressed against it, resists further slippage.

Inasmuch as the central ring 18 floats between the cushions 21 and 22 the forces of compression on these two cushions are automatically equalized, and the same holds true as between the two outside cushions 20 and 23, the intervening disc assembly being free to move axially relative to the rim to balance the forces on these two cushions. As the force exerted by the cushions against the metal parts is very large and the outer peripheries of the discs are capable of slight flexure, there is also some compensation of the forces on the inner cushions 21 and 22, on the one hand, and the outside cushions 20 and 23, on the other hand, so that even though there may be some slight dimensional inaccuracies in the parts or variations in the yielding properties of the cushions, the compensating action will cause each cushion to take substantially its full share of the load.

The wheel may be conveniently assembled with the aid of the apparatus of Fig. 3, which comprises a table 26 and a press plunger 27 operated above it. The rim 13 is placed on its side, rail flange upward, upon the table, the plunger being at its lifted position and into the rim are inserted loosely all the wheel parts in the order shown in Fig. 3, with the exception of the snap ring 24. The hub bolts 30 may be inserted in their apertures but the nuts on these bolts are not at this time completely drawn up.

With the parts thus loosely positioned, the plunger 27 is caused to descend to the position of Fig. 3 wherein the rubber cushions are held axially compressed, the discs 11 and 12 are in contact with their seats on the hub 10, and the ring 19 occupies a position below the recess 25, permitting insertion of the snap ring 24. The snap ring is then inserted in the recess and the key 32 is bolted in place to lock the ring, and the nuts of the bolts 30, 30 are drawn up to secure the discs 11 and 12 to the hub. To provide access to the bolts for the last-mentioned operation the table may be apertured at 34 and the plunger at 35, in alignment with the bolts. The plunger may now be lifted, whereupon the cushions are held in their compressed condition and the assembled wheel is ready for installation on a vehicle.

If desired, instead of assembling all the parts in one operation as above described, the discs 11 and 12, the intermediate ring 18, the two cushions 21 and 22 and the hub 10 may be assembled as a unit by a preliminary operation, which will in some cases give greater convenience in obtaining close contact of the discs with the hub before the bolts are applied. For this purpose the rim 13 may be used as a centering device, the parts above-mentioned being placed in the rim with the disc 12 resting on the flange 17 of the rim, and the plunger then being lowered to press against disc 11 and compress the two cushions until the discs are seated against the hub, whereupon the bolts may be tightened to hold this assembly permanently together. The plunger is then lifted to permit insertion of the cushions 20 and 23 and the ring 19, and the plunger is again lowered to compress the cushions sufficiently to permit insertion of the snap ring as in the procedure above described.

In the embodiment of Figs. 4 and 5 is shown a snap ring 36 formed with a beveled seating surface 37 cooperating with a correspondingly beveled wall of a recess 38 in the rim. The ends of the ring 36 are formed with sloping end surfaces 39, 39 as shown in Fig. 4, and a cooperating wedge member 40 is adapted to be clamped between these ends by means of a stud bolt 41 positioned in an aperture in the wedge member and clamping the wedge member to the underlying ring 42. The aperture in the wedge member is preferably elongated for adjustment so that this construction permits the convenient securing of the parts at the desired compression of the cushions without the necessity of using shims or requiring a high degree of dimensional accuracy of the parts, the parts being simply depressed by the plunger to the desired point and the snap ring 36 and wedge member 40 then inserted and secured in place with the several wedge surfaces in contact so that the parts will be held to that position upon release of the plunger.

In the modification of Fig. 6 the rubber cushions, instead of being full-circular as in Fig. 1, are provided as a plurality of curved sections 45, 45 spaced apart at their ends, at 46, 46, and held in place by the pressure of the metallic members in the axial direction in a manner similar to the full-circle forms hereinbefore described. This segmental construction permits a greater deflection of the hub with relation to the rim for a given load, in case the softer cushioning is desired, without requiring a lessening of the radial-width of the rubber which preferably is kept generously large to resist creepage of the cushions by rolling of them vertically along the metal surfaces under the vertical deflections, and without requiring a greater axial thickness of the cushion or wheel structure, other conditions being the same.

Variations may be made without departing from the scope of the invention as it is hereinafter claimed.

I claim:

1. A wheel comprising a rim structure, a wheel structure in intercalated relation with said rim structure, bodies of rubber between said structures, and means comprising a snap ring for holding said structures in association with the rubber bodies held compressed between them a determinate amount in the axial direction, the snap ring having a beveled surface engaging a corresponding surface on the rim structure.

2. A wheel comprising a rim structure, a wheel structure in intercalated relation with said rim structure, at least one body of rubber between axially opposed faces of the structures, said rim structure having an inwardly facing recess having a beveled wall and means comprising a retaining member having a beveled face cooperating with the beveled wall of said recess for holding the structures with said rubber body compressed between them in the axial direction.

HENRY F. SCHIPPEL.